United States Patent

[11] 3,540,528

| [72] | Inventor | Charles L. Moon |
| | | Brecksville, Ohio |
| [21] | Appl. No. | 682,785 |
| [22] | Filed | Nov. 14, 1967 |
| [45] | Patented | Nov. 17, 1970 |
| [73] | Assignee | White Motor Corporation |
| | | Cleveland, Ohio |
| | | a corporation of Ohio |

[54] COOLANT FILTER FOR INTERNAL COMBUSTION ENGINE
12 Claims, 6 Drawing Figs.

[52] U.S. Cl. .................................................. 165/119;
41 42; 210/167
[51] Int. Cl. .................................................. F28f 19/00
[50] Field of Search............................................ 165/72,
110, 134, 119; 123/41.01, 41.02, 41.1, 41.54, 41.21, 41.26;
210/167; 55/(Consulted)

[56] References Cited
UNITED STATES PATENTS

| 1,028,115 | 6/1912 | Huff ........................... | 123/41.21 |
| 1,717,689 | 6/1929 | Hunt ........................... | 123/41.21 |
| 1,987,847 | 1/1935 | Flood ......................... | 210/167 |
| 2,082,866 | 6/1937 | Alexander.................... | 210/167X |
| 3,002,624 | 10/1961 | Vettel et al. ................. | 210/167 |
| 3,362,536 | 1/1968 | Sellman........................ | 210/167 |
| 2,784,705 | 3/1957 | Baster .......................... | 123/41.42 |
| 2,841,127 | 7/1958 | Baster .......................... | 123/41.1 |

Primary Examiner—Robert A. O'Leary
Assistant Examiner—Theophil W. Streule
Attorney—Watts, Hoffmann, Fisher & Heinke ABSTRACT: A cooling system for an internal combustion engine includes a radiator, coolant pump, and conduit system interconnecting the radiator, engine, pump, and a removable coolant filter. The filter utilizes a cartridge and a removable cartridge carrier which are vertically removable as a unit.

INVENTOR.
CHARLES L. MOON
BY
Watts, Hoffmann, Fisher & Heinke
ATTORNEYS.

INVENTOR.
CHARLES L. MOON
BY
Watts, Hoffmann, Fisher & Heinke
ATTORNEYS.

INVENTOR.
CHARLES L. MOON
BY
Watts, Hoffmann, Fisher & Heinke
ATTORNEYS.

COOLANT FILTER FOR INTERNAL COMBUSTION ENGINE

BACKGROUND OF THE INVENTION

1. Field of the Invention.

The present invention relates to liquid cooled internal combustion engines and more particularly to a filtration apparatus for the cooling system of an internal combustion engine.

Present day automotive vehicles utilize pressurized coolant systems to maintain relatively high operating temperatures and attendant high efficiencies. While the maintenance of clean cooling systems has always been desireable, the advent of the pressurized cooling systems has made it almost mandatory. Moreover, with highway trucks and tractors maintenance of clean, deposit-free cooling systems and consequently more reliable and efficient truck operation contribute to the operation of a profitable trucking business. This is especially so with the relatively high-speed, heavy load and long distance operations to which modern truck vehicles are subjected.

After periods of sustained engine operation, foreign material accumulates in the engine coolant and more important, in the coolant passages unless steps are taken to prevent it. Such material may, for example, be in the form of rust accumulated from the walls of the coolant passages of the engine and mineral deposits in "hard" water used as coolant. If this foreign matter is not removed from the coolant, an amount of the foreign matter will be permitted to build up such that coolant passages will become blocked and/or the coolant medium itself will lose its heat transfer capabilities. Accordingly, modern cooling systems often have provision for deaeration of the coolant and for filtering of it. They may also have water-softening devices.

2. Description of the prior art.

Prior proposals for filtration devices for use with internal combustion engines have customarily comprised units separate from the conventional engine or coolant radiator. Such systems have required elaborate tanks, hoses, and valves taking up additional space in the engine compartment and requiring additional maintenance. Service of these systems, such as filter replacement, is difficult because of inconvenient locations. Moreover, it is necessary to close valves in inlet and outlet lines prior to servicing the filter. Failure to close them before replacing a filter results in loss of coolant. Failure to open the valves after service effectively leaves the filter "cut out" of the system.

The Baster U.S. Pat. No. 2,784,705, entitled "Water Softener" discloses a cooling system in which some of these problems are overcome. The system of that patent, like other systems and proposed systems, has not fully solved the problem of facile cartridge replacement with attendant assured and simple removal of accumulated sludge and deposits.

SUMMARY OF THE INVENTION

To overcome the above-mentioned and other problems encountered in the prior art, the present invention comprises a compact cooling system for an internal combustion engine including a radiator, coolant pump, a novel and improved filter assembly, and conduit system interconnecting the radiator, engine, pump, and filter. The filter assembly is preferably mounted integrally either with the radiator as shown in the drawings or, where there is a separate surge tank, in the surge tank. The filter assembly has a sump region above a filter element for the collection of foreign material as coolant passes downward through the filter. The filter has one or more inlets which may be connected to desired portions of the cooling system as necessitated by the demands of the engine. An outlet of the filter communicates with a portion of a coolant tank, which may either be the mentioned surge tank or the reserve tank of a radiator. The filter assembly includes a filter cartridge and a carrier. The cartridge may be removed by itself from the carrier and the reserve tank or the cartridge and carrier may be removed from the tank as a unit. Preferably, the filter cartridge, and its carrier are disconnected from the radiator and removed before accumulated foreign matter is ejected. Thus, this novel construction assures the removal of all accumulated sediment, sludge and the like. None of the foreign matter can be left in the cooling system and there is no filter housing or the like which requires cleaning after a filter has been removed.

Another advantage of the present invention is that it occupies a minimum amount of space as compared with prior mechanical filtration systems.

Further advantages result from the filter cartridge being mounted in an upper portion of the radiator and being vertically removable. The filter cartridge is (a) easily accessible for maintenance purposes: (b) removable with minimal coolant loss; and, (c) removable without any valves being opened or closed to prevent coolant flow.

Accordingly, the present invention has for its general object the provision of a novel and improved filtration device for an engine cooling system.

Additional objects and a further understanding of the present invention may be had with reference to the following detailed description and claims taken in conjunction with the drawings.

DESCRIPTION OF THE PREFERRED EMBODIMENT

Figure 1:
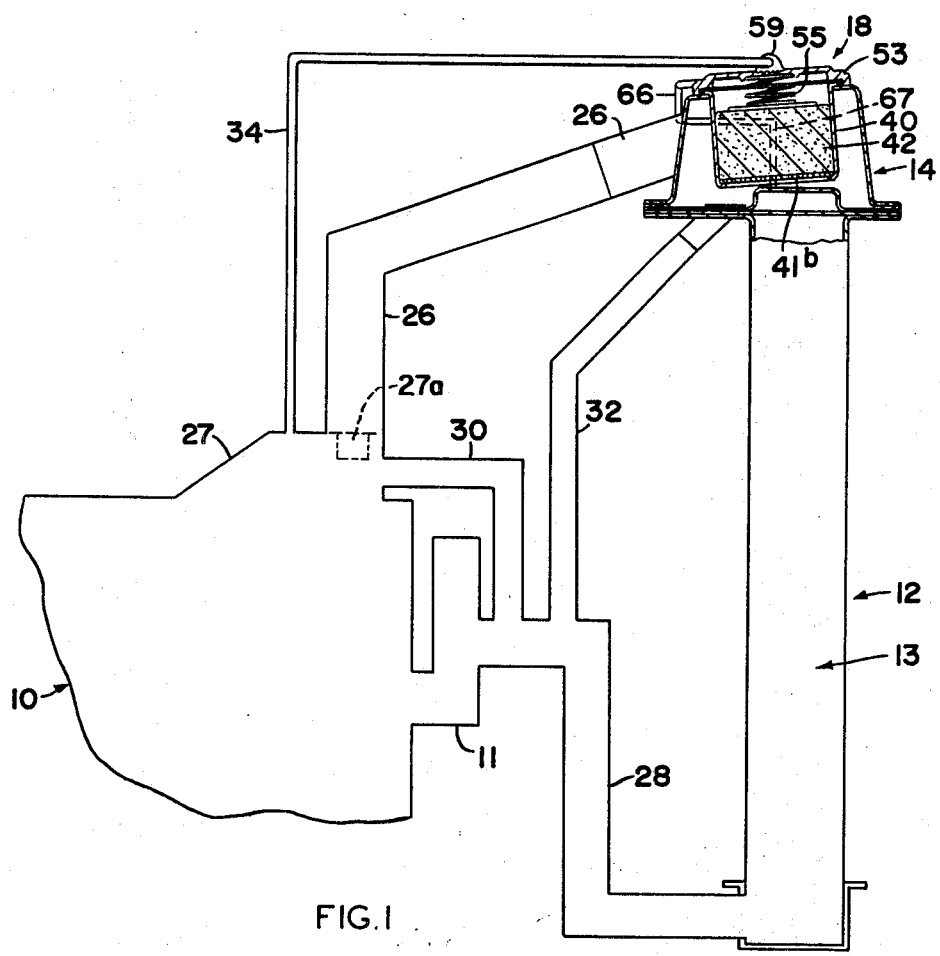
FIG. 1 is a schematic diagram of a cooling system for an internal combustion engine.

Referring to FIG. 1 of the drawings, a fragmentary schematic view of an internal combustion engine is shown at 10. The engine 10 is provided with a coolant pump 11, and a cooling radiator 12 including a core assembly 13 (of upper and lower main tanks and a core) and a reserve tank 14. A filter assembly is shown generally at 18. The filter assembly 18 is mounted on the reserve tank 14 and communicates with coolant contained therein.

The engine 10 and the radiator 12 are interconnected via conduits for the passage of the coolant. A radiator inlet conduit 26 is interconnected between the upper main tank of the core assembly 13 and the outlet of an engine thermostat housing 27. A pump supply conduit 28 is interconnected between the lower main tank of the core assembly 13 and the pump 11. A thermostat bypass line 30 interconnects the thermostat housing 27 and the pump supply conduit 28 for circulating coolant when thermostat 27a is closed. A static or supply conduit 32 interconnects the reserve tank 14 and the pump supply conduit 28. A filter supply conduit 34 interconnects the filter assembly 18 and a portion of the engine cooling system upstream from the thermostat. As shown, the inlet conduit is connected to the thermostat housing 27.

Figure 2:
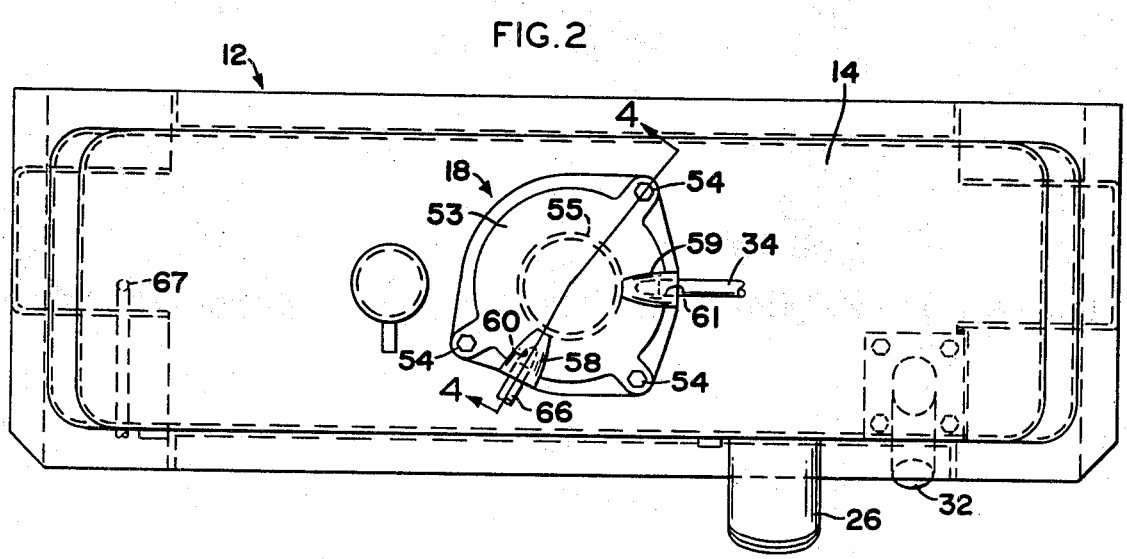
FIG. 2 is a top plan view of a radiator and filter assembly.
Figure 3:
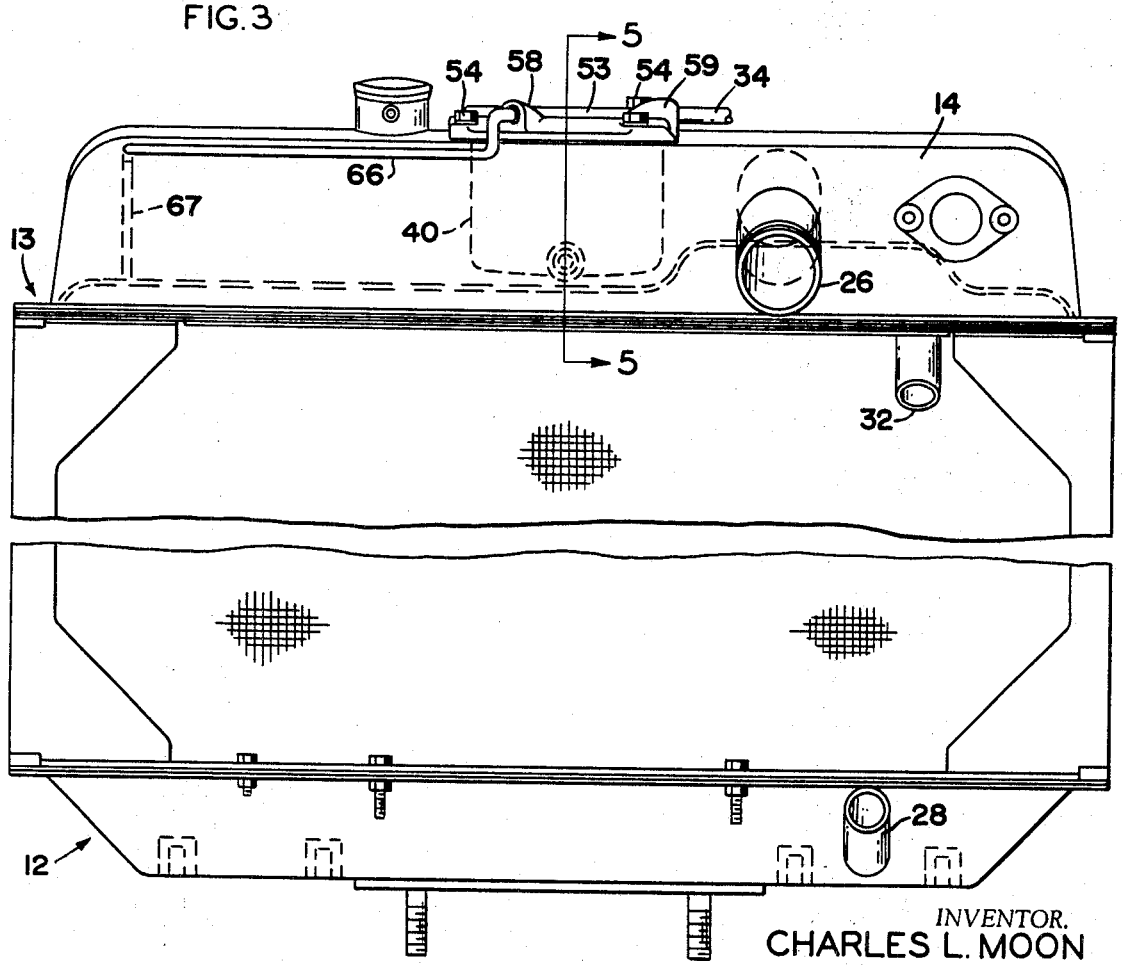
FIG. 3 is a fragmented rear elevational view of the radiator and filter assembly shown in FIG. 2.

The mounting of the filter assembly 18 on the radiator 12 is shown in detail in FIGS. 2—6. As shown in FIGS. 2 and 3, the filter assembly 18 is mounted on the reserve tank 14 and projects downwardly therein. The filter assembly 18 includes a tubular cartridge carrier 40. The carrier 40 houses a cartridge which includes a top plate 41a, a foraminous bottom plate or wall 41b, and a filter element 42.

Figure 4:
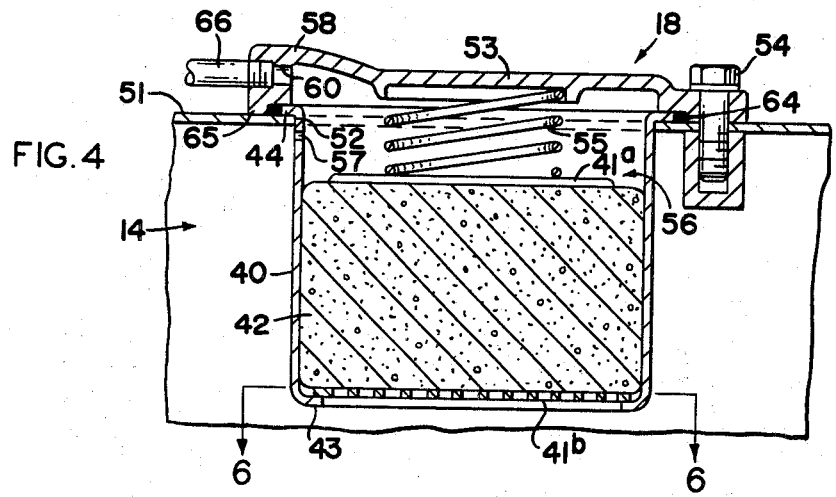
FIG. 4 is a vertical sectional view on an enlarged scale of the filter assembly as seen from the planes indicated by the lines 4–4 of FIG. 2.
Figure 5:
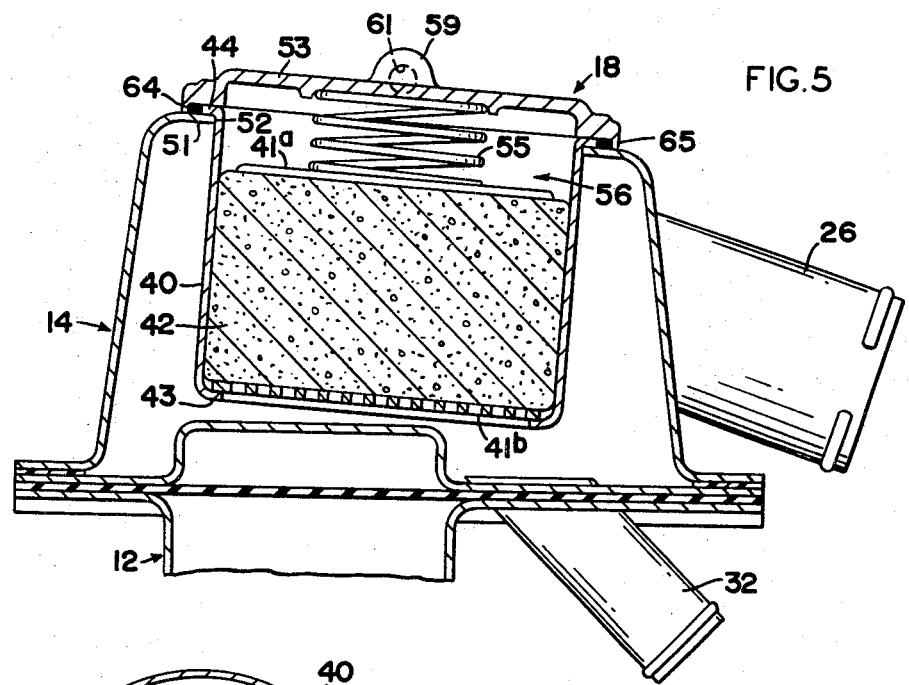
FIG. 5 is a vertical sectional view, on the scale of FIG. 4, of the filter assembly and the radiator reserve tank, as seen from the plane indicated by the line 5–5 in FIG. 3.
Figure 6:
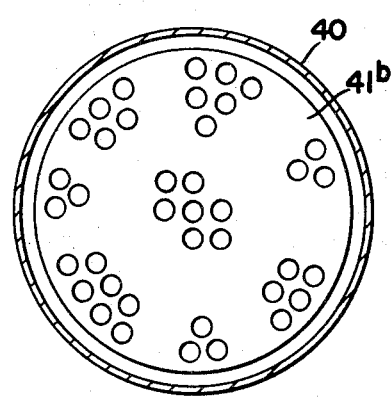
FIG. 6 is a sectional view of the filter assembly as seen from the plane indicated by the line 6–6 of FIG. 4 and showing a plan view of the lower plate or wall of the filter cartridge.

As shown in FIGS. 4 and 5, the filter element 42 is preferably composed of a suitable filtering media and may include chemical agents for water softening or acid neutralizing. The upper and lower plates 41a, 41b may be sacrificial plates.

The cartridge carrier 40 has a lower, annular, inturned flange 43 which engages the bottom wall 41 and supports the cartridge. The carrier 40 has an upper, outwardly extending flange 44 which engages upper wall 51 of the reserve tank 14. The wall 51 has an opening 52 sufficiently large to receive the cartridge carrier 40 but small enough so that the upper flange 44 overlies the opening 52 and engages the upper wall 51 to support carrier 40 and the cartridge 41, 42.

The filter assembly 18 includes a cover 53 which overlies the carrier 40 and its upper flange 44. The cover is removably secured in place as by bolts 54. A spring 55 is interposed between the cover and the upper plate 41a. The spring 55 biases the cartridge against the lower flange of the carrier 40 and in turn the upper flange 44 against the wall 51 of the reserve tank 14. Space 56 above the filter cartridge is a sump space in which the sediment collects in a manner to be described presently. The sump space 56 is vented to the reserve tank 14 through a bleed hole 57.

The cover 53 includes two enlarged inlet portions 58, 59. The inlet portions 58, 59 define inlet ports 60, 61, respectively, for admitting coolant to the sump region 56 of the filter assembly 18. A gasket 64 is located between the cover 53 and the upper wall of the reserve tank. The gasket 64 surrounds the upper flange 44 of the carrier 40 and the ports 60, 61 to prevent the escape of coolant. Spaced downward projections 65 maintain the gasket 64 in proper orientation on assembly of the filter assembly 18.

As shown, the inlet portion 59 is connected to the filter supply conduit 34 which is connected to the thermostat housing 27. The port portion 58 is shown connected by conduit 66 to a radiator deaerator line 67. Alternately, the deaerator line 67 may conventionally terminate near the top of the reserve tank 14 and the conduit 66 may be connected to the water manifold or elsewhere on the engine, to provide a filter supply paralleling the conduit 34.

In operation, coolant is supplied to the pump 11 via the supply line 28, the thermostat bypass line 30, and the static line 32. Once the engine is at operating temperature, the majority of the coolant is returned from the engine to the radiator 12 by the radiator inlet 26. The filter supply line 34 passes coolant from the thermostat housing 27 through the inlet port 61 and into the sump region 56. Coolant proceeds downwardly through the filter element 42 and into the reserve tank 14. It is preferred that the filter supply line 34 is so located that when the thermostat in the housing 27 is in a closed position, coolant may circulate to the filter assembly 18.

For servicing, the filter cartridge 41, 42 may be easily removed from the reserve tank 14 by first removing the bolts 54 and cover 53. The cover 53 is then shifted out of the way and obviously the conduits 34, 66 should be flexible to facilitate this. The cartridge carrier 40 and cartridge together with collected sediment are then removed as a unit. The collected sediment and any other foreign material are then ejected from the cartridge carrier 40 by pressing on the bottom wall 41 to eject the filter cartridge from the carrier 40. The carrier 40 may then be cleaned—if desired, a new filter cartridge is inserted—and the filter assembly 18 reassembled.

Although the invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In combination with in an internal combustion engine including a thermostat housing, an improved cooling system comprising:
  a. a radiator core assembly;
  b. a pump connected to the core assembly and the engine for circulating coolant therethrough;
  c. a tank positioned substantially at the top of said system;
  d. first and second thermostat conduits connecting the thermostat housing to the core assembly and to the pump for delivering coolant to the core assembly when a thermostat is open and to the pump when such thermostat is closed;
  e. a filter assembly mounted in said tank and including a carrier and a filter cartridge removably carried in the carrier, the carrier defining a sump space above the cartridge; and
  f. a filter fluid conduit connected to said filter assembly sump space and to the engine for delivering circulating coolant to the sump space, the filter fluid conduit to engine connection being upstream from the thermostat whereby the condition of the thermostat does not prevent delivery of coolant to the sump space.

2. The system of claim 1 wherein said filter assembly comprises:
  a. a tubular cartridge carrier element having an outwardly directed flange structure near one end and an inwardly directed flange structure near the other end;
  b. the filter is a filter cartridge positioned in the carrier element and of a transverse dimension greater that the internal transverse dimension of said inwardly directed flange structure whereby the cartridge is maintained in the carrier element by the inwardly directed flange structure;
  c. said carrier element projects through an aperture in a wall of said tank and the outwardly directed flange structure is in abutment with said tank wall;
  d. a cover element secured to said tank wall and overlying said carrier;
  e. a spring interposed between the cover element and the cartridge to bias the cartridge against said inwardly directed flange structure and thereby bias the outwardly directed flange structure against said tank wall; and
  f. one of said elements defining an inwardly directed port connected to said conduit.

3. In a cooling system for an internal combustion engine including a cooling system having a tank, a radiator and a pump, the improvement comprising:
  a. a removable filter assembly including a carrier mounted in said tank and a filter element removably carried by the carrier, the carrier having a circumferentially endless portion defining walls of a sump chamber, the element being positioned beneath the sump chamber;
  b. conduit means interconnecting said engine, radiator, pump and filter assembly in said tank and forming a circulating system for coolant to flow downwardly through the sump chamber and through said filter element; and
  c. said filter element and said carrier being removable as a unit with the element to facilitate the removal of the element and collected matter from the system.

4. The system of claim 3 wherein:
  a. said carrier is a tubular element having an outwardly directed flange structure near one end and an inwardly directed flange structure near the other end;
  b. the filter is a filter cartridge positioned in the carrier element and of a transverse dimension greater than the internal transverse dimension of said inwardly directed flange structure whereby the cartridge is maintained in the carrier element by the inwardly directed flange structure;
  c. said carrier element projects through an aperture in a wall of said tank and the outwardly directed flange structure is in abutment with said tank wall;
  d. the assembly includes a cover element secured to said tank wall and overlying said carrier;
  e. a spring interposed between the cover element and the cartridge to bias the cartridge against said inwardly directed flange structure and thereby bias the outwardly directed flange structure against said tank wall; and,
  f. one of said elements defining an inwardly directed port connected to said conduit.

5. The assembly of claim 4 wherein said one element is said cover element.

6. The assembly of claim 4 wherein the carrier has a bleed hole therethrough for connecting said space with a surrounding tank space.

7. In an internal combustion engine cooling system wherein a tank has a top wall with a filter assembly opening therein, a filter assembly projecting through the opening and comprising:
 a. a cartridge carrier connected to the tank and insertable and removable through said opening;
 b. a filter cartridge removably carried in the carrier and spaced from one end of the carrier whereby to define a sump space within the carrier and above the cartridge, said carrier including an endless portion defining the walls of the sump space;
 c. said system including structure locating the top of the carrier near the tank wall whereby to facilitate manual removal of the carrier;
 d. a cover removably secured to the tank wall and overlying the carrier and the cartridge;
 e. means maintaining the cartridge spaced from the top of the carrier and from the cover;
 f. a conduit connecting the engine to the sump space for delivering coolant to the space when the engine is operating; and
 g. said cartridge and carrier being removable as a unit when said cover is removed whereby collected sediment in said sump space is removed when the cartridge and the element are removed as a unit.

8. In an internal combustion engine having a cooling system including a thermostat housing, the combination of:
 a. a tank having a top wall with a filter assembly opening therein;
 b. a cartridge carrier connected to the tank and insertable and removable through said opening;
 c. a filter cartridge in the carrier and spaced from one end of the carrier whereby to define a sump space within the carrier and above the cartridge, said carrier including an endless portion defining the walls of the sump space;
 d. said system including structure locating the top of the carrier near the tank wall whereby to facilitate manual removal of the carrier;
 e. a cover removably secured to the tank wall and overlying the carrier and the cartridge;
 f. means maintaining the cartridge spaced from the top of the element and from the cover;
 g. a conduit connecting the engine to the sump space for delivering coolant to the space when the engine is operating; and
 h. said cartridge and element being removable as a unit when said cover is removed whereby collected sediment in said sump space is removed from the tank when the cartridge and the element are removed as a unit.

9. The combination of claim 8 wherein said conduit to engine connection is upstream from said thermostat housing whereby the condition of the thermostat does not prevent filtering of coolant.

10. In an internal combustion engine including a cooling system, a filter assembly mounted in a tank of the cooling system comprising:
 a. A tubular cartridge carrier element having an outwardly directed flange structure neat one end and an inwardly directed flange structure near the other end;
 b. a removable filter cartridge in the carrier element and of a transverse dimension greater than the internal transverse dimension of said inwardly directed flange structure such that the cartridge is maintained in the carrier element by the inwardly directed flange structure;
 c. said carrier element projecting through an aperture in a wall of the tank and the outwardly directed flange structure abutting the tank wall;
 d. a cover element secured to said tank wall and overlying said carrier;
 e. a spring interposed between the cover element and the cartridge and biasing the cartridge against said inwardly directed flange structure and thereby biasing the outwardly directed flange structure against the tank wall;
 f. one of said elements defining an inwardly directed port for directing fluid into the space between the cover element and the cartridge;
 g. said carrier element and said cartridge being removable as a unit from said tank upon removal of said cover element and said cartridge being thereafter facilely removable from said carrier element for cleaning the carrier and removal of collected sediment; and
 h. said carrier element including an endless portion immediately above said cartridge whereby sediment collected on top of the cartridge is maintained within the carrier element until the carrier element and the cartridge are removed from the tank as a unit.

11. The assembly of claim 10 wherein said one element is said cover element.

12. The assembly of claim 10 wherein the carrier has a bleed hole therethrough for connecting said space with a surrounding tank space.